(12) United States Patent
Gough

(10) Patent No.: US 7,905,456 B2
(45) Date of Patent: Mar. 15, 2011

(54) MOUNTING SYSTEM FOR PERSONAL ELECTRONIC DEVICES

(76) Inventor: Roy Gough, Arroyo Grande, CA (US)

( * ) Notice: Subject to any disclaimer, the term of this patent is extended or adjusted under 35 U.S.C. 154(b) by 612 days.

(21) Appl. No.: 11/981,868

(22) Filed: Oct. 31, 2007

(65) Prior Publication Data

US 2009/0108169 A1 Apr. 30, 2009

(51) Int. Cl.
*F16M 13/00* (2006.01)
(52) U.S. Cl. ............ 248/160; 248/309.1; 248/316.2
(58) Field of Classification Search .............. 248/160, 248/230.71, 230.6, 274.1, 288.31, 230.7, 248/309.1, 316.2
See application file for complete search history.

(56) References Cited

U.S. PATENT DOCUMENTS 5,890,985 A * 4/1999 Jenney .................... 473/447
2001/0025905 A1* 10/2001 Carpenter et al. ......... 248/160

FOREIGN PATENT DOCUMENTS

| JP | 2006-119554 A | 5/2006 |
| KR | 20-0405364 Y1 | 1/2006 |
| KR | 10-0610357 B1 | 8/2006 |

* cited by examiner

*Primary Examiner* — Ramon O Ramirez
(74) *Attorney, Agent, or Firm* — Mark Rodgers

(57) ABSTRACT

A mounting system for personal electronics devices is described. The mounting system is intended for use in vehicles and consists of a compressible base which may be wedged by hand into a variety of openings and spaces in a vehicle passenger compartment. A bendable arm extends from the base, such that personal electronics items attached to the arm may be positioned in a convenient location.

13 Claims, 6 Drawing Sheets

MOUNTING SYSTEM FOR PERSONAL ELECTRONIC DEVICES

RELATED APPLICATIONS

Not Applicable

FEDERALLY SPONSORED RESEARCH

Not Applicable

SEQUENCE LISTING

Not Applicable

BACKGROUND OF THE INVENTION

The invention relates to a mounting system for personal electronic devices, and in particular to a system that provides a wide range of mounting options in the passenger compartment of a vehicle A variety of products are available whose purpose is to allow hands-free use of personal electronics devices, such as cell phones, PDA's, music players, satellite radios, GPS receivers, and the like, in the passenger compartment of vehicles, such as automobiles, boats or aircraft. Some of these products are device specific, available either from the device manufacturer or third parties, while others purport to be device-universal. A significant drawback of currently available mounting devices is that, whether or not they are designed for one or more devices, they are all limited to one specific mounting placement. For instance, some mounting systems are designed to mount in cup-holders, such as the Belkin TD1-F8Z077 iPod® holder. Other currently available mounting placement options are suction cups to window glass (such as the Arkon SR-053), plugging into a power-point (such as the Arkon CM-983), or clipping to a structure such as an air-vent (such as the Arkon SR-047-SRVC). For any given passenger compartment, none of these options may be convenient, or may only be convenient for one type of device in a specific vehicle, requiring a user to have multiple mounting systems for each device he may own, and different systems for each vehicle he may use. Moreover, many of these mounting systems are not very robust in actual use, and very few of these devices provide for a tidy placement of power cables and the like. For these reasons, customer satisfaction with vehicle electronics mounting systems is, for the most part, low. Furthermore the lack of suitable mounting systems is a safety issue as many currently available devices lead to driver distraction caused by fumbling for loose cords or stray electronic devices.

What is desired is a mounting system sufficiently flexible in mounting placement, that a convenient, robust placement can be obtained for almost any vehicle. What is also desired is this mounting system should further be compatible with virtually any electronic device of hand-held size.

Furthermore, what is desired, is a mounting system that improves ergonomic use and safe operation of a moving vehicle by reducing handling of a personal electronic device to view displays, push buttons, or apply charging cords.

BRIEF SUMMARY OF THE INVENTION

The invention is a mounting system for personal electronic devices, including a compressible base and a bendable arm extending from the base. The base is adapted to be compressible by hand to 20% to 95% of its uncompressed dimensions, sized to compress into openings of between 1" and 4" in at least one dimension, and adapted to exert a restoring force opposing compression. In preferred embodiments, the restoring force is substantially in the range of 1 to 10 lbs at 5% compression. In a tested version, the base is constructed of a polyurethane foam material with a density greater than 2 lbs. per cubic foot and a firmness (25% deflection) psi between 0.5 and 5.

In one embodiment, the bendable bar is attached to the base and adapted to be pushed by hand through at least one slit extending through the base in the compressible material and the bar is thereby positionable within the base. In a preferred embodiment, the bar's cross-section is between ½" to 1.75" wide, and ⅛"-⅜" thick.

In a version of the invention, the base has two slits, substantially at right angles to each other, allowing for two orientations of the bar.

In another embodiment, the mounting system includes a bottom bracket, positionable along the length of the bar. The bottom bracket may optionally include a non-permanent locking mechanism, to lock the bar in place once positioned. The bottom may also include at least one cable clamp.

In another embodiment, the mounting system also includes a top bracket, positionable along the length of the bar. The top bracket may include at least two positionable fingers adapted to provide temporary restraint to objects resting on the bottom bracket and may also include a non-permanent locking mechanism, to lock the bracket in place once positioned.

In another version of the invention the bottom bracket may also include a mounting provision for vertically or horizontally securing a personal electronics power connector to allow for docking of a device. Therefore, this provision allows for many simple power connectors to be converted to docking ports, providing simultaneous mounting and charging of a device in one step.

In another embodiment of the invention, the mounting base may be shaped, and possibly colored, to resemble an icon such as company logos, for marketing purposes.

BRIEF DESCRIPTION OF THE DRAWINGS

The invention will be better understood by referring to the following figures.

DETAILED DESCRIPTION OF THE INVENTION

Figure 1:
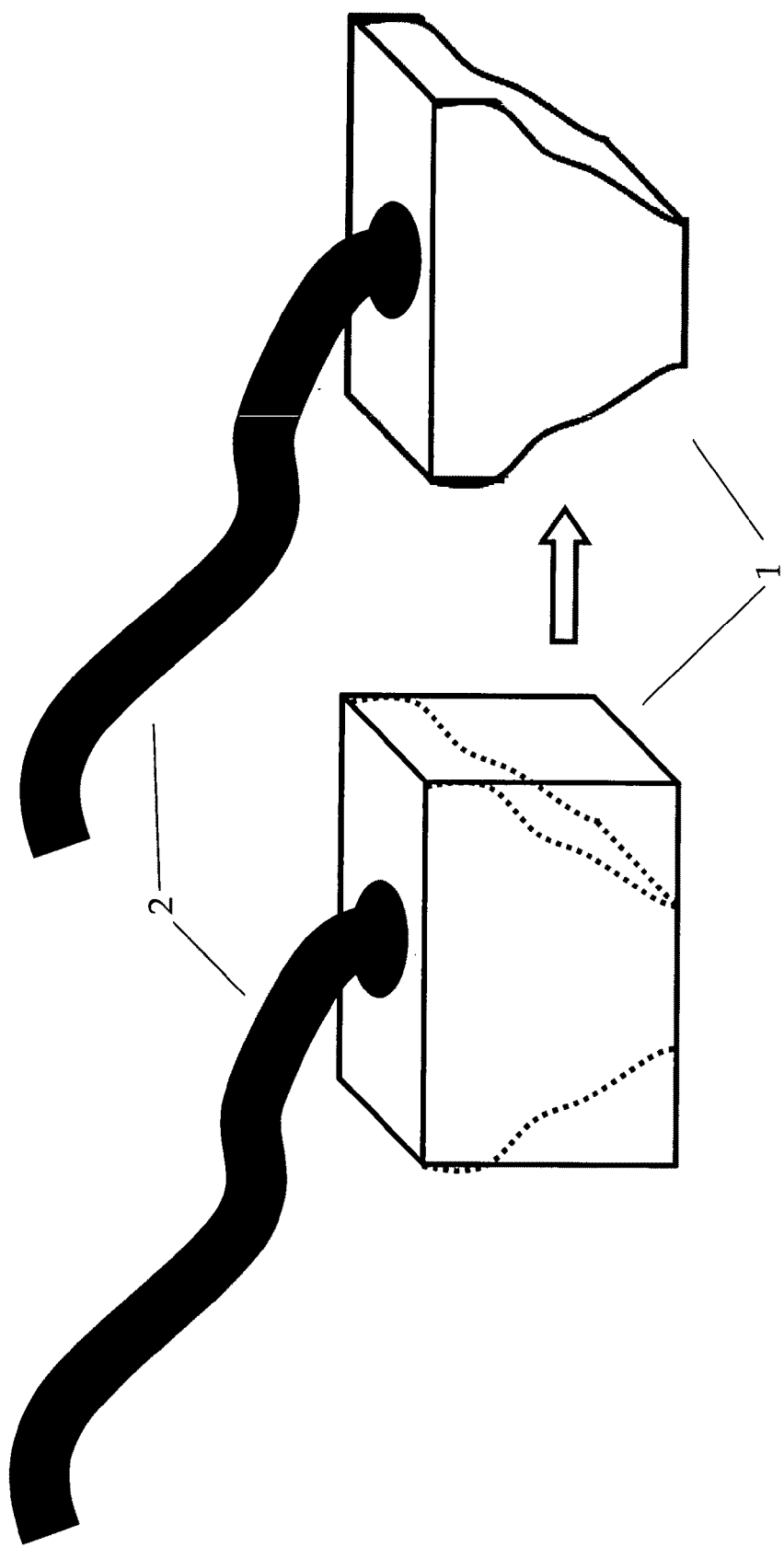
FIG. 1 depicts schematically the main elements of the invention.
Figure 2:
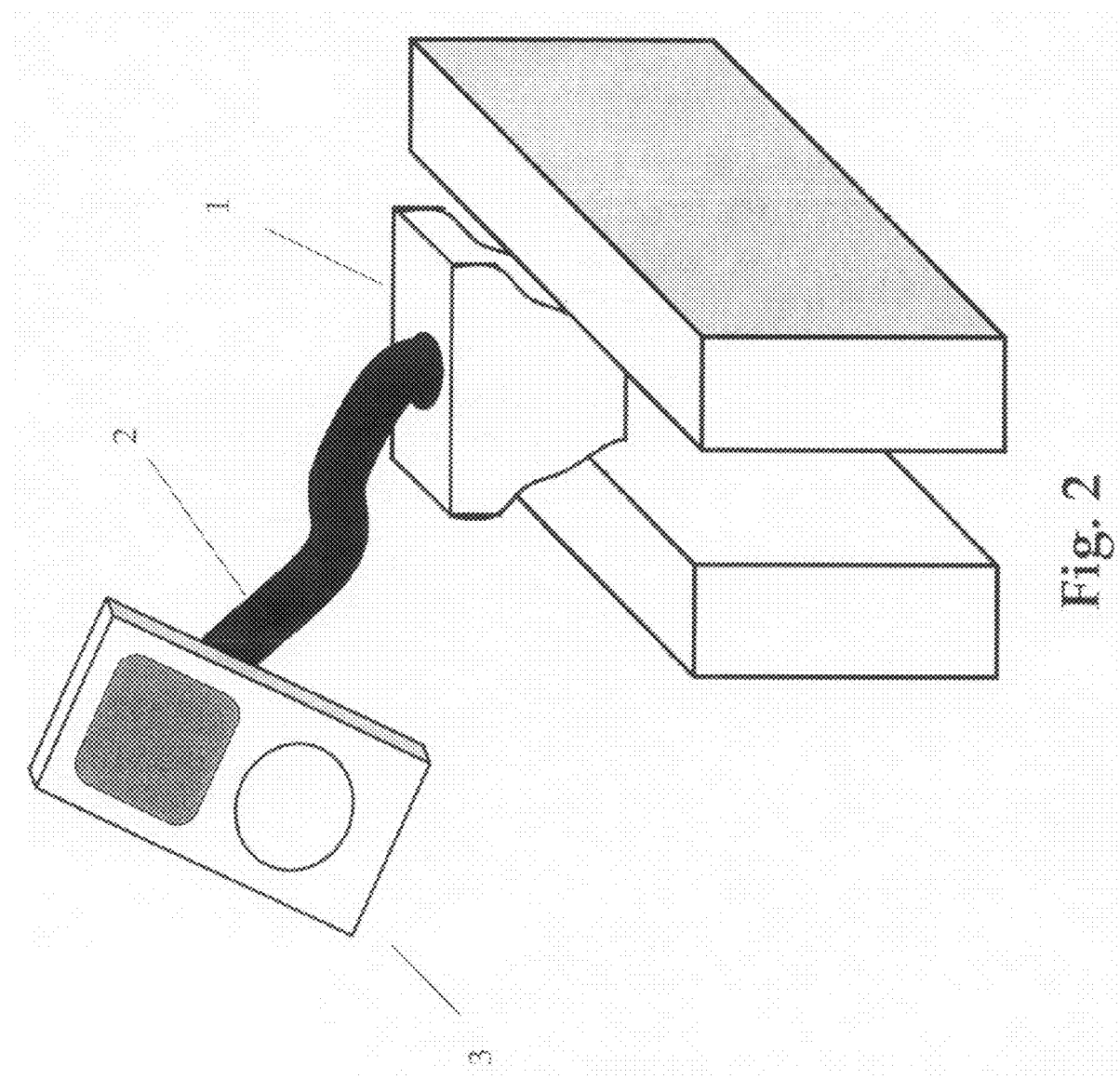
FIG. 2 shows how the invention is used.

Referring to FIG. 1, the main elements of the invention are depicted. The invention is a compressible base 1 coupled with a bendable arm, or bar, 2, such that the arm extends from a surface of the base. As shown in FIG. 2, base 1 can be compressed into an opening, thus firmly wedging the base so it can be used as a solid support for a personal electronics device 3, which is attached to the bendable arm 2. Although not limited to any specific types, the invention is primarily intended for devices such as cell phones, PDA's and personal music players, but specific instantiations of the invention have been shown to handle larger devices as well including GPS, small video players, and portable gaming devices. Compressible base 1 is chosen such that it can be wedged by hand into a variety of openings, provide an adequate support when wedged to support the kind of loads created by a device on an arm, and when removed by hand, elastically restore itself such that the process can be repeated for a large number of cycles. Bendable arm 2 is chosen such that it is easily bendable by hand, yet firm enough to support the load of the device, and sized to allow convenient attachment, such as being compatible with the belt clips available for most electronic devices. It will be understood by those skilled in the art that "operable by hand" is defined in many ergonomic standards, and thus sets defined design limits for the purposes of the invention. For instance may examples of hand-bendable arms exist, including many for electronic device operation, so "bendable by hand" is well-understood in the art.

The result of the elements as described above is a base that can be conveniently wedged into openings such as found in automobile passenger compartments. Examples of openings intended to be compatible with the base include, but are not limited to, openings in center consoles, openings in doors, cup-holders, openings in dash consoles, ashtrays, seat-back pockets, at the crease where the windshield and dash meet, and gaps between seat elements and other structures. The inventor has found that compressibility of from 4" down to less than 1", or from 5% to 80% compression, covers the range of many gaps and openings found in a passenger compartment. The base may be constructed out of any number of materials so long as the resultant base can be compressed to provide sufficient restoring force to remain wedged under normal weight bearing conditions. Therefore, the inventor has determined at least one dimension of the base should be sized at least 5% larger than the largest gap in which it may be placed and the material or design chosen should have a tendency toward regaining its original shape, thus creating a restoring force that will produce a usable product, i.e., operable by hand and capable of supporting loads due to a wide range of personal electronics devices attached to the arm. Increasing contact surface area and adding a slip-resistant finish, such as a rubberized coating, increases friction and enhances performance at lower restoring force levels. Materials such as high-resiliency polyurethane foam rubber with a density greater than 2 lbs. per cubic foot and a firmness (25% deflection) psi between 0.5 and 5 are a specific example of a material with the required properties of wedge-ability, firmness of lodging over the range stated, and sufficient elasticity to recover original size and spring tension to allow for at least hundreds of installation/removals. Other examples of possible materials configurations include, but are not limited to, a nylon/spandex bag filled with rubber beads, silicone filled bladders, air or liquid-filled shapes, rubber, plastics, vinyl, or even metal springs, so long as the material acts, or can be configured to act as a spring, or, provide sufficient restoring force through material displacement of the wedge. A wide variety of shapes have been found suitable. For simplicity a simple rectangular solid is shown in the drawings by way of example. A ball shape, as well as many others, would have utility.

The properties of the base can cover a wide range depending on the trade-offs made between springiness, friction of contact, base size, and intended load. For instance the inventor has constructed a prototype, a square-shaped base made of the foam described above, approximately 4" wide by 2" thick and covered with a rubber-coated exterior. This base works well, carrying a wide range of devices cantilevered out as far as 8" on the bendable arm, and easily wedged by hand into a variety of openings in automobile passenger compartments. However much less springy base materials could be used if a higher-friction exterior was employed. The inventor has modeled the novel mounting device at 5% compression as an aid to choosing base designs. Arm length, device weight, base contact area, and coefficient of friction between base and mounting surface all impact the springiness or restoring force required for the base. Loads less than 8 oz, cantilevered out less than 8" cover most of the range required, while reasonable coefficients of friction would normally fall well within the range of 0.5 to 1.5, typically closer to 1. Assuming a base length of 4", the model predicts a restoring force on the order of 3 lbs, possibly as high as 5 lbs if a low friction surface is used. Such a wedge firmness combined with good "memory" characteristics, i.e., returns to original shape and size when un-wedged, would produce a useful device. However, depending on intended load, friction of the surface and so forth, far lower restoring forces may be workable. But even for a much smaller base, smaller intended load, and as high as practical a coefficient of friction, a restoring force of >1 lb. is typically required. Although the required restoring force for the high force models, is around 5 lbs, there is no reason not to allow for forces up to the low end of hand grip forces, which looking at standard ergonomic data is >10 lbs. Therefore 10 lbs is a practical upper limit as it falls below all categories of hand strength, meaning the base is hand compressible by almost everyone. Although bases with restoring forces outside of the 1-10 lb range fall within the scope of the invention, the inventor envisions most implementations would be in this range.

The bendable arm 2 in FIG. 1 is shown extending from a top surface of the solid, but clearly many other arrangements are possible. An arm with the required properties should preferably be between ½" to 1.75" wide, and ⅛"-⅜" thick. Such an arm made from two lengths of 10 gauge copper wire or other gauge wire with similar properties, encased in, but not limited to, a flexible plastic, rubber, vinyl, PVC, or leather sheath, will have the required bend-ability, firmness of support and will last for at least hundreds of bending cycles. The result is a system that can be placed, removed, and replaced in many locations in a passenger compartment, with an arm that can be bent to provide convenient placement of a device from all of those locations, and the arm is of a size to allow convenient mounting of the device in the desired orientation. Thus the invention in its basic form provides greatly improved convenience, flexibility, and universality to the problem of organization, placement, and hands-free use of electronic devices in passenger compartments of vehicles.

Figure 3:
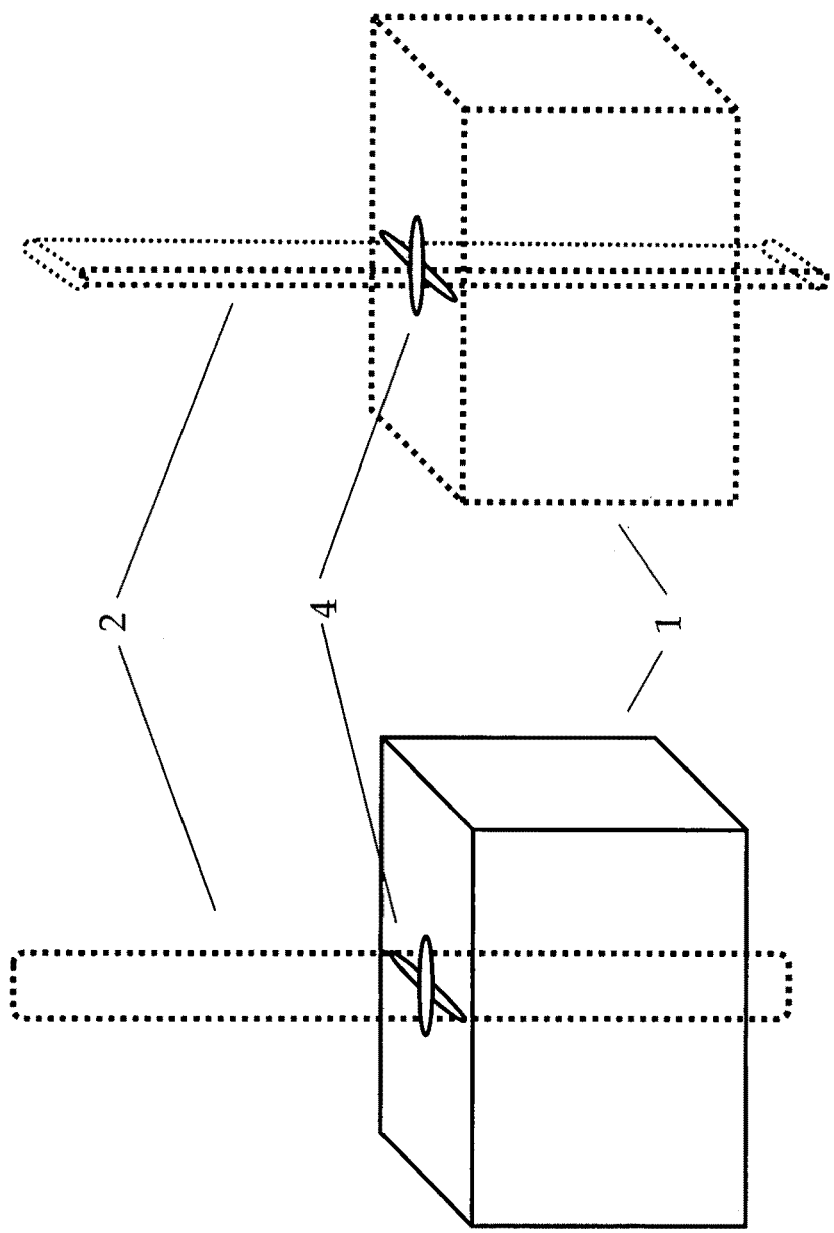
FIG. 3 illustrates a preferred embodiment of the bendable bar

Although the basic invention as described is useful, it's utility can be further improved as will be shown in the description of various embodiments. In FIGS. 1 and 2 the bar 2 is shown attached to the base, but other arrangements are possible. In FIG. 3, base 1 is shown with at least one slit 4, extending into, and preferably through base 1. For base materials as specified above, and bar sizes as mentioned, a slit 4, possibly produced by a cut, mold, or leaving an un-bonded section in a sandwich, through the base material will allow for convenient hand sliding of the bar 2 through slit 4, while maintaining enough restraining force on the bar for adequate positioning firmness for the intended loads. Thus a slit 4 as shown in FIG. 3 allows for positioning the bar relative to the base. Multiple slits, or two crossed slits 4 as shown in the figure further can be employed to allow for more than one mounting orientation of bar 2. Preferably the slit length is about the width of the bar to prevent undue rocking of the bar. The bar is also removable in this version, allowing for the bar to be used on its own for openings too small to wedge the base into.

Figure 4:
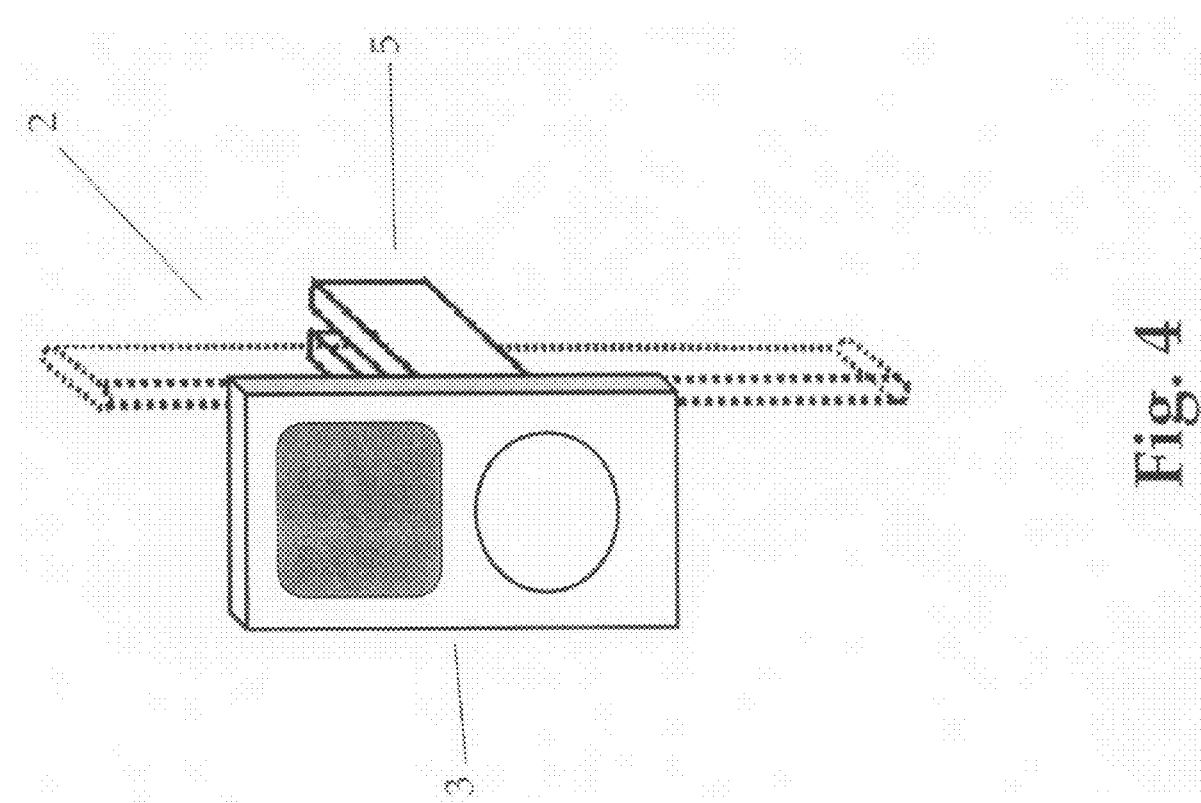
FIG. 4 shows a personal electronics device clipped onto the bendable bar.
Figure 5:
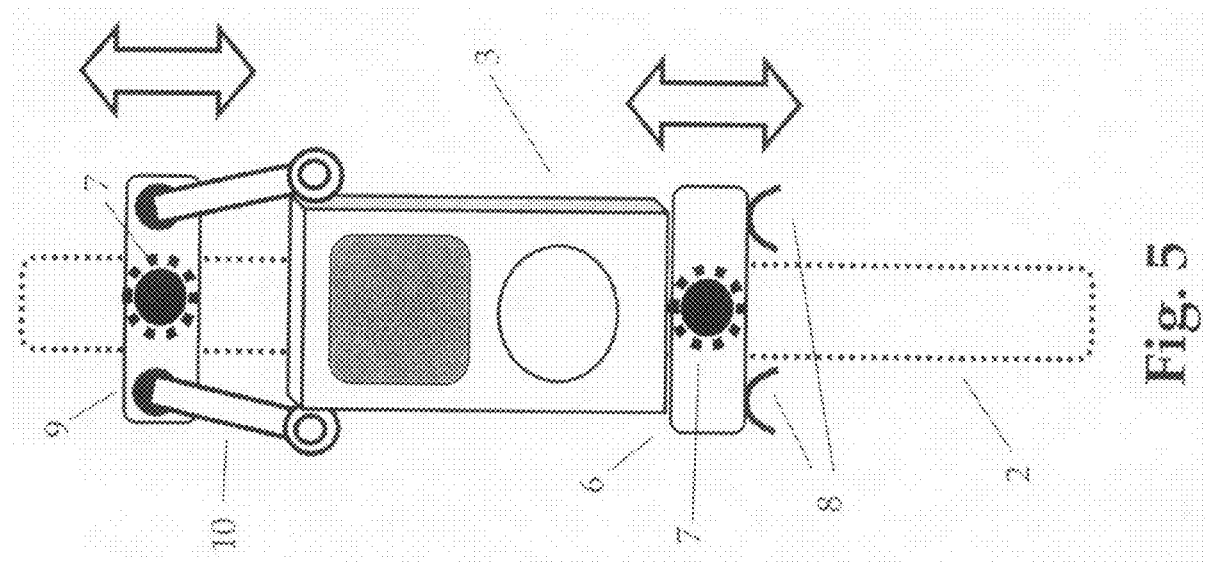
FIG. 5 shows the optional bottom and top brackets.

The simplest device mounting provision, shown in FIG. 4 is simply clipping the device on the bar. Alternative device mounting versions of the invention are shown in FIG. 5. A bottom bracket, 6, adapted to slide along the arm 2 may be optionally provided. The bottom bracket 6 may further have a locking mechanism 7, such that when the bracket is positioned where desired, it may be locked into place. One such locking mechanism is a thumbscrew. Other locking mechanisms include, but are not limited to, a locking switch or a spring-loaded switch. Alternatively the bottom bracket may be designed to automatically "brake" against the bar when downward pressure is placed on the bracket. Conversely, the top bracket may be designed to brake against upward pressure. In addition, bottom bracket 6 may be further enhanced with provision 8 for clamping cables associated with device 3 in place. Examples include cable clips, or tension clips. These clips may have a provision to allow for loose movement of power cords or for secure placement of cord heads. The bracket may also be provisioned to provide slight tension against the bar to keep it in place along the length of the bar.

A top bracket 9, also adapted to be position-able along bar 2, and with optional locking provision 7, may also be a part of a version of the invention. Top bracket 9 may be adapted to simply clamp device 3 between itself and bottom bracket 6, or may be provisioned with clamping devices, such as ratcheting fingers 10 as shown. In a preferred embodiment, these adjustable fingers are designed to rotate so they may adapt to different electronic devices and can be positioned by the user as to not interfere with device ports, controls, or antennas. The bottom and top brackets may also be provisioned with flexible tabs to help hold a device in place and allow for easy removal and replacement of an electronic device between brackets.

Figure 6:
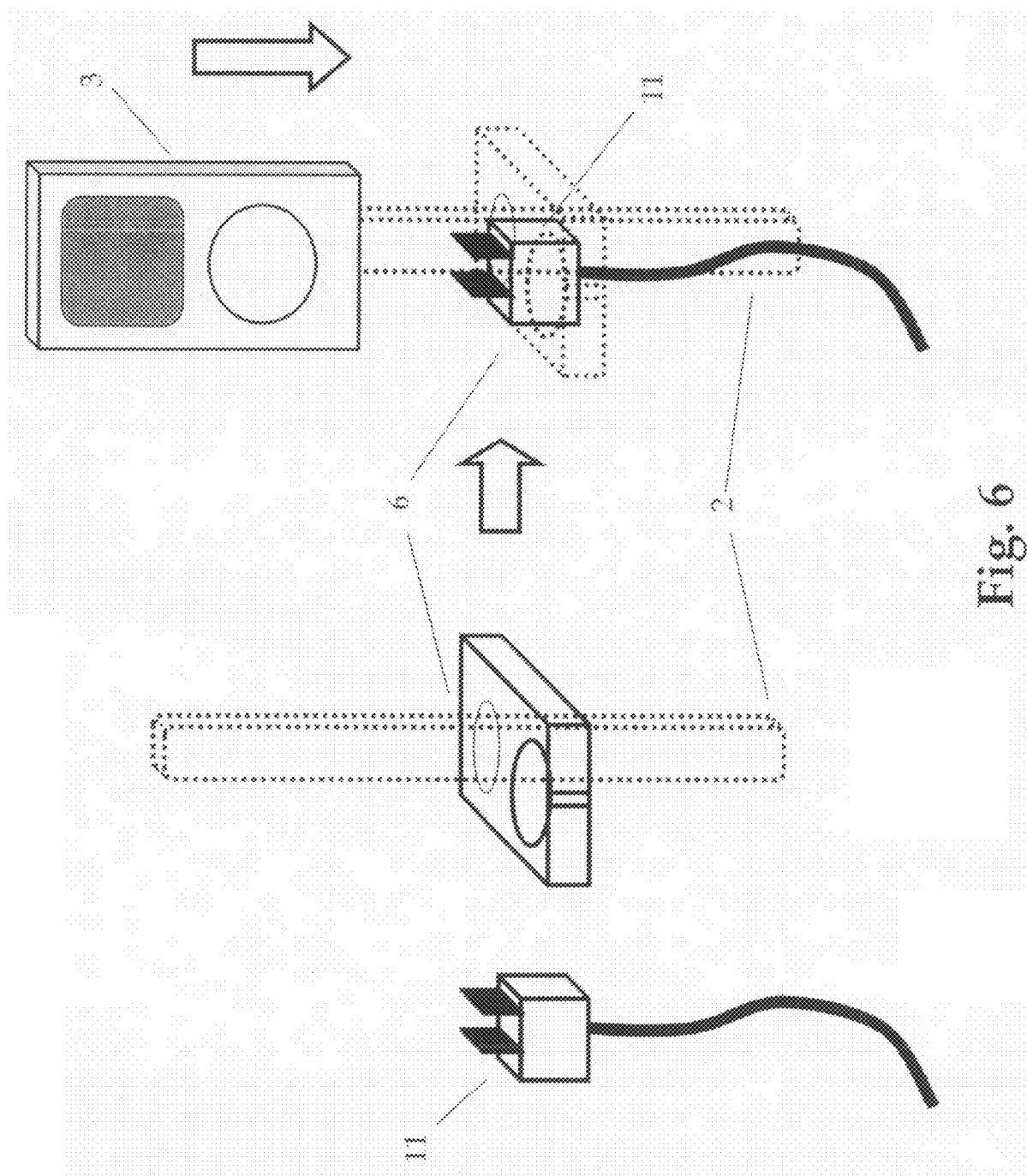
FIG. 6 shows the optional provision for a device docking connector.

In another embodiment, depicted in FIG. 6, bottom bracket 6 may be adapted to conveniently hold a device power cable 11. Therefore, it expands the utility of a user's power cable by converting it into a dual-purpose dock, thus, allowing the user to mount and charge certain electronic devices in a single convenient one-handed step.

Because the wedge base may be designed in wide range of compressible shapes, the device may be used as a marketing vehicle in that the base can be manufactured and shaped and possibly colored to three-dimensionally represent company logos, icons, and the like.

I claim:

1. A mounting system for personal electronic devices, comprising;
    a compressible base, wherein the base;
        is compressible by hand from 95% to 20% of its uncompressed dimensions,
        is sized to compress into openings of between 1" and 4" in at least one dimension,
        exerts a restoring force opposing compression; and,
    a positional device placement bar extending from the base, easily positionable by hand, firm enough to support the load of a device and sized to allow convenient attachment.

2. The base of claim 1 wherein the restoring force is substantially in the range of 1 to 10 lbs at 5% compression.

3. The base of claim 1 wherein the base is constructed of a polyurethane foam material with a density greater than 2 lbs. per cubic foot and a firmness (25% deflection) psi between 0.5 and 5.

4. The mounting system of claim 1 wherein the bar is attached to the base adapted to be pushed by hand through at least one slit extending through the base in a compressible material, whereby the bar is positionable within the base.

5. The mounting system of claim 2 wherein the base has two slits, substantially at right angles to each other, allowing for two orientations of the bar.

6. The system of claim 1 further comprising a bottom bracket, adapted to be positionable along the length of the bar.

7. The bottom bracket of claim 6 further comprising a non-permanent locking mechanism, adapted to lock the bracket in place on the bar once positioned.

8. The bottom bracket of claim 6 further comprising at least one cable clamp.

9. The system of claim 6 further comprising a top bracket, adapted to be positionable along the length of the bar.

10. The top bracket of claim 9 further comprising at least two positionable fingers adapted to provide temporary restraint to objects resting on the bottom bracket.

11. The top bracket of claim 9 further comprising a non-permanent locking mechanism, adapted to lock the bracket in place on the bar once positioned.

12. The bottom bracket of claim 6 further comprising a mounting provision for a personal electronics docking connector.

13. The mounting system of claim 1 wherein the base is at least one of shaped or colored to depict a marketing icon.

* * * * *